United States Patent [19]
Fessenden

[11] 3,816,928
[45] June 18, 1974

[54] NAVIGATIONAL COMPUTER

[76] Inventor: Edward Fessenden, 21 Beech Hill Rd., Huntington, N.Y. 11743

[22] Filed: Mar. 21, 1972

[21] Appl. No.: 236,661

[52] U.S. Cl. .................. 33/150, 33/1 C, 33/1 SB, 33/149 R
[51] Int. Cl. ...... G01b 3/16, G01c 21/20, G06c 1/00
[58] Field of Search.......... 33/1 C, 1 SB, 1 CC, 150, 33/149 R, 149 E, 151, 27 R, 27 B

[56] References Cited
UNITED STATES PATENTS

| 283,907 | 8/1883 | Low | 33/150 |
|---|---|---|---|
| 1,998,352 | 4/1935 | Bachmann | 33/149 R |
| 2,645,021 | 7/1953 | Dierkes | 33/150 |
| 3,045,353 | 7/1962 | Barbosa | 33/140 R |

FOREIGN PATENTS OR APPLICATIONS

| 114,073 | 3/1918 | Great Britain | 33/150 |

Primary Examiner—John W. Huckert
Assistant Examiner—Milton S. Gerstein
Attorney, Agent, or Firm—Kane, Dalsimer, Kane, Sullivan & Kurucz

[57] ABSTRACT

A computer for use with navigation charts can determine any one unknown in the formula, speed $x$ time = distance. The computer has a pair of speed scale arms with similar speed scales displayed thereon. Each arm terminates at one end in a speed scale point which is positioned on a check point of a navigation chart. At the other end the speed scale arms are pivotally connected. A time scale arm has a time scale displayed thereon and is pivotally mounted on one of the speed scale arms. The time scale arm intersects the speed scale on the two speed scale arms.

2 Claims, 4 Drawing Figures

PATENTED JUN 18 1974 3,816,928

NAVIGATIONAL COMPUTER

BACKGROUND OF THE INVENTION

The invention is directed to a navigational instrument and, in particular, to a computer for use with nautical charts.

With pleasure boating reaching an all time popularity, there has arisen a need for providing a simple, inexpensive, readily used computer for aiding the neophyte boat enthusiast in navigation along crowded coastal waterways. For the most part, prior art hand-held devices have been designed primarily to calculate flight data for aircraft. Such devices, as those illustrated in U.S. Pats. No. 2,551,997 and U.S. Pat. No. 3,045,353, are impractical for the average amateur boatsman in that they are expensive, difficult to operate, unwieldy awkward to stow and overly sophisticated. Further, such devices are not readily adapted or even usable with nautical charts published by National Ocean Survey (formerly Coast & Geodetic Survey). Additionally, aircraft computers are indexed with speeds of from 10 to 100 times those normally encountered in pleasure boating. This along makes such aircraft computers useless for normal nautical navigational needs.

SUMMARY OF THE INVENTION

It is, therefore a primary object of the invention to provide an inexpensive compact, simplified navigation computer.

It is another object of the invention to provide a navigation computer adapted for use in conjunction with standard nautical charts.

The above and other objects are met in a computer for use with navigation charts for solving any one unknown in the formula speed $x$ time = distance which includes first and second speed scale arms each having the same speed of travel scale similarly displayed thereon extending in a direction from the lower end of each lower portion of each arm towards an upper portion of each arm and having speed scale points at the lower end thereof to be positioned on the check points of a navigation chart and being pivotally connected adjacent their upper ends and a time scale arm slidably mounted on the first speed scale arm and extendable across the second speed scale arm and having displayed thereon a time scale extending in a direction from the first speed scale arm towards the second speed scale arm. By placing the speed points upon two selected check points on a navigation chart, the time of travel can be predicted by shifting the time scale arm so as to cause the time scale to intersect the selected speed of travel on the speed scale. The speed of travel can be selected for traveling between selected chart points at a predetermined elapsed time by shifting the time scale arm to cause the selected time on the time scale to intersect the speed scale on the speed scale arm.

BRIEF DESCRIPTION OF THE DRAWINGS

In the accompanying drawings, a somewhat preferred embodiment of the invention is illustrated wherein.

DESCRIPTION OF PREFERRED EMBODIMENTS

Figure 1:
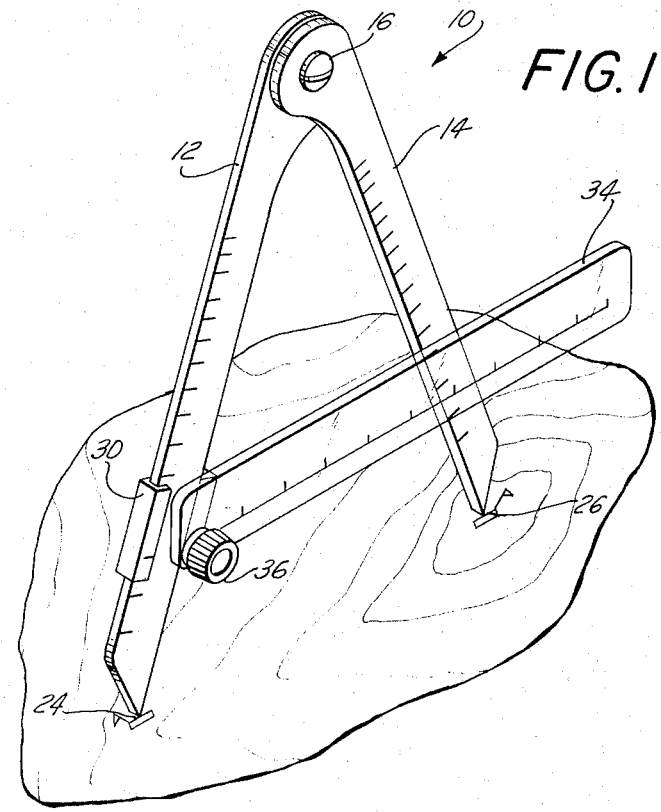
FIG. 1 is a perspective view of a navigational computer of the invention where the speed scale points are placed on check points of a nautical chart.

As shown in FIG. 1, navigation computer 10 is a true analog computer which quickly and simply solves any one unknown of the formula, speed $x$ time = distance where distance on the water is the distance between points 24 and 26 multiplied by the scale of the chart. Computer 10 is particularly useful when employed in conjunction with standard National Ocean Survey (formerly Coast & Geodetic Survey) nautical charts. The computer is commonly employed with chart scales such as 1:80,000, 1:40,000 or 1:20,000. Such scales include all of the 1,200 series charts, most of the Small Craft (SC) charts and about 60 percent of the other coastal charts shown in Nautical Chart Catalog I.

Figure 2:
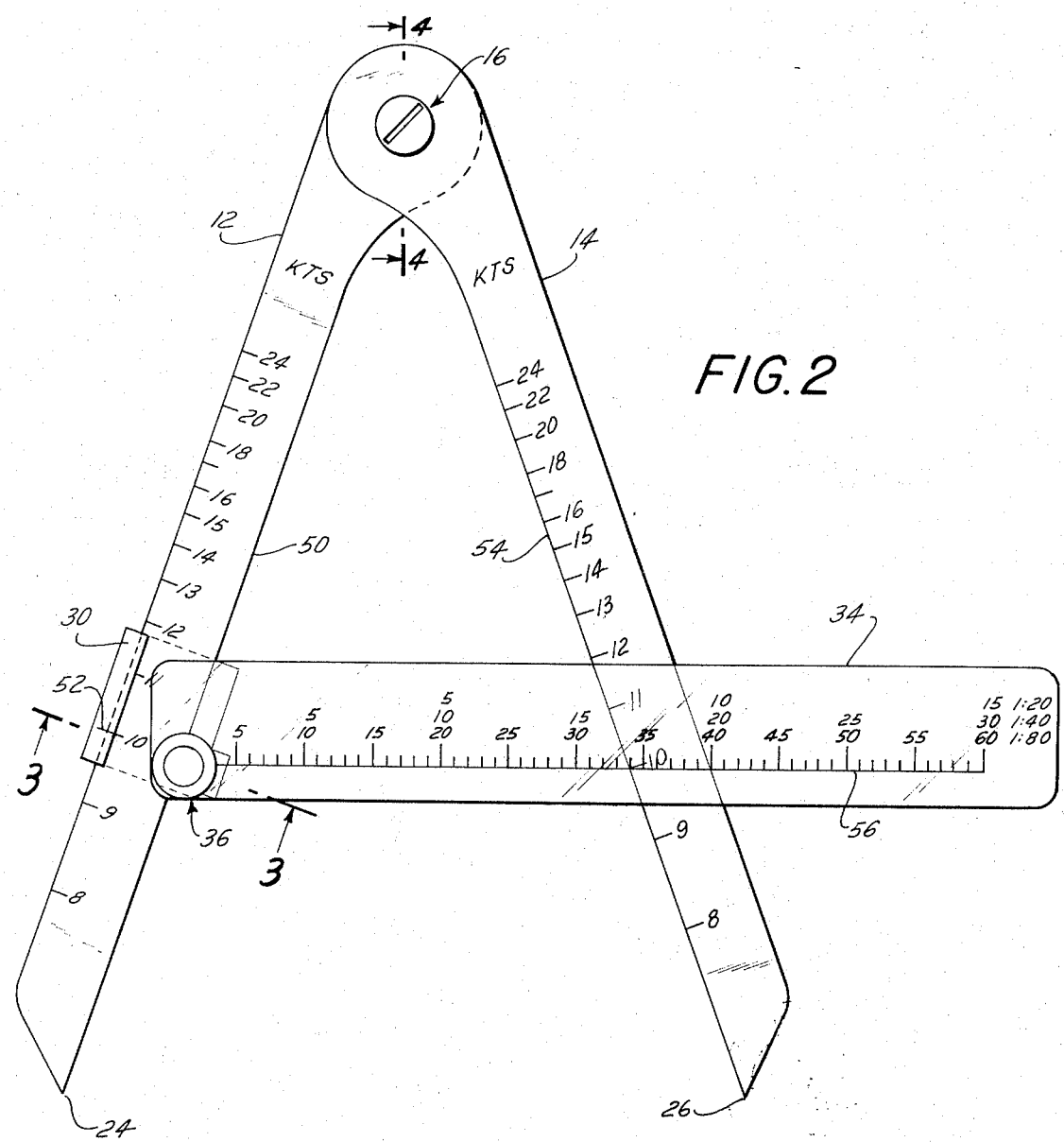
FIG. 2 is a front view of the nautical computer illustrating the relative placement of the indicia for speed and time.
Figure 4:
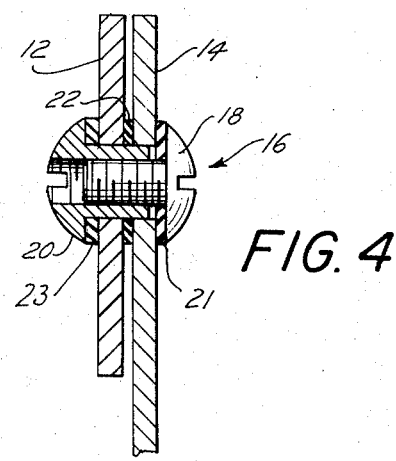
FIG. 4 is an enlarged, cross-sectional view of a self-locking hinge screw assembly for the speed scale arms taken along line 4—4 of FIG. 2.

Referring now to FIGS. 1 and 2, computer 10 is formed from first and second speed scale arms 12,14 pivotally connected, at one end by means of self-locking hinge screw assembly 16. As illustrated in FIG. 4, a suitable self-locking screw assembly is described in Military Specification MIL-F-18240 entitled Fastener, Externally Threaded Self-Locking Element. It consists of a threaded screw 18 with a nylon insert or fused patch which forms a yieldable interference fit with the female threads of a tubular nut 20. Washers 21, 22 and 23 permit freedom of circular motion. The ease with which the speed arms are rotated toward or away from each other is regulated by tightening or loosening screw 18. As screw 18 is tightened, it threads and locks into tubular nut 20 and causes speed arms 12 and 14 to be compressed between the head of tubular nut 20 and the head of screw 18.

Figure 3:
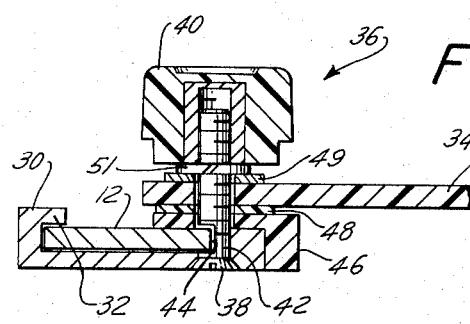
FIG. 3 is an enlarged, cross-sectional view of a time scale pivot assembly of the invention taken along line 3—3 of FIG. 2.

At the other end of speed scale arms 12 and 14 respectively, are speed scale points 24 and 26. Cursor 30 is slidably mounted on speed scale arm 12. As illustrated in FIG. 3, cursor 30 is provided with a shoulder 32 adapted to slidably engage arm 12.

Time scale arm 34 is pivotally connected to speed scale arm 12 by means of pivot assembly 36. As shown in FIG. 3, pivot assembly 36 also engages cursor 30 such that cursor 30 and time scale arm 34 move together in slidable engagement with speed scale arm 12. Pivot assembly 36 is designed so that as it is initially tightened, by means of cap nut 40, cursor 30 is engaged and locked against lateral movement along speed scale arm 12 and thereafter, upon further tightening, time scale arm 34 is further engaged and inhibited against rotational movement.

Pivot assembly 36 is provided with threaded screw 38. Screw 38 extends through cursor 30, time scale arm 34 and threads into internally threaded cap nut 40. The threaded barrel 42 of screw 38 has a rectangular channel 44 in order to permit the free passage therethrough of speed scale arm 12. This arrangement also prevents turning of screw 38 when nut 40 is tightened.

In order to arrest the movement of cursor 30 on speed scale arm 12, an L-shaped clutch plate 46 is inserted over screw barrel 42 and engages arm 12 and cursor 30. A resilient spacer 48 is spaced immediately above clutch plate 46 and is held against movement by screw barrel 42. As cap nut 40 is rotated clockwise down the barrel of screw 38 clutch plate 46 is frictionally engaged by spacer 48 and forced against speed scale arm 12 and cursor 30, thus effectively arresting movement of cursor 30 along the arm.

Resilient spacer 48 acts as a second clutch plate with plate 46 in order to permit time scale arm 34 to rotate about screw 38 while pressure is applied to clutch plate 46. Spacer 48 provides sufficient pressure on plate 46 to prevent lateral movement of cursor 30 but permits rotational movement of time scale arm 34. For this purpose it is particularly preferred to employ a cork and rubber washer as the spacer element. Washer 49 and split locking washer 51 are provided along screw barrel 42 between screw cap 40 and time scale 34 to permit cap nut 40 to be locked against loosening during rotational movement of time scale 34.

Since the speed-time computer 10 is often employed in close proximity to salt water, it is preferred to use components fabricated from corrosion-resistant materials. Speed scale arms 12 and 14 are preferably formed from anodized aluminum, as well as cursor 30. Screws, washers, and locking nuts are preferably formed from stainless steel. Time scale arm 34 is preferably formed from a transparent rigid plastic such as acrylic plastic (PLEXIGLAS) or polycarbonate. Clutch plate 46 is preferably formed from a compressible plastic such as nylon (polyamide) or PLEXIGLAS, an acrylic plastic molding powder with a refractive index of 1.49, a specific gravity of from 1.18 to 1.19 and a heat distortion temperature in the range of from 75° to 92°C.

It is ncessary that the scale arm points 24 and 26 be on the inside edge of the respective scale arms. Similarly, pivot assembly 36 must be pivotally connected to speed scale arm 12 with its vertical axis intersecting the inside edge 50 of arm 12. Cursor 30 is provided with a speed index mark 52. Speed index mark 52 must extend in a plane which passes through the center of screw barrel 42. The zero of the time scale 56 is also at the center of screw barrel 42. Further, the central axis of hinge screw 16 must be the apex of the triangle formed by extending the inner edges 50, 54 of the respective speed scale arms to the hinge screw. The aforesaid alignments are necessary since the computer is based on the geometrical theorem that similar sides of similar triangles are proportional. The speed scale hinge 16 and the time scale pivot 36 form two corners of a triangle wherein the intersection of the time scale 34 and speed arm 14 forms a third corner for the first triangle, which is proportional to the triangle formed from the intersection of the speed scale points with a flat chart and hinge 16.

For nautical navigational purposes a workable speed time computer employs a time scale 6 inches in length with speed arms of from 7 ½ to 8 inches in length. The indicia on the speed scale are in knots and, for most practical purposes, run from 4 to 12 knots with a base time scale of 120 minutes for a 1:80 nautical chart scale for sailboats with auxiliary engines and the like or from 8 to 24 knots, as illustrated in FIG. 2 with a base time scale of 60 minutes for the 1:80 scale nautical chart for power boats of the cruiser type or the like. The ratio of the lowest speed to the highest speed for a specified computer should be no greater than about 1:3. Beyond this ratio the speed indicia tend to be unduly crowded together and difficult to read. Further, it is difficult to align the time scale with such crowded indicia. It will be obvious that other speed scale ranges such as those from about 3 to 9 knots or from about 6 to 18 knots can be employed.

In operation, as illustrated in FIG. 1, the elapsed time from point to point may be calculated by setting point 24 of speed scale arm 12 on a course check point provided on standard nautical charts. The other point 26 is then set on a second known check point on the chart. Next, time scale pivot nut 36 is loosened so that cursor 30 slides freely. Cursor 30 is positioned on speed scale 12 until speed index 52 is opposite the assumed speed. Then cursor 30 is locked in place by tightening time scale pivot assembly 36. At this point, time scale arm 34 should still pivot easily.

The time scale arm is then pivoted until the linear time line 56 intersects inner edge 54 of speed scale arm 14 at the same speed previously set on speed scale arm 12. As shown in FIG. 2, the time line is provided with three sets of numerals which correspond to the specific nautical chart scales (1:20, 1:40 or 1:80) employed. At this point the time line 56 should be parallel to a line extending between check points 24 and 26. The elapsed time between the specified chart locations at the indicated speed is read on the time line 56 at the point where the time line intersects the inside of speed scale arm 14. For example, the time line in FIG. 2 indicates a reading of 34 minutes for the 1:80,000 scale at a speed of 10 knots.

In order to calculate the average speed necessary to go from one chart check point to another for a specified time the following steps are performed. Check points 24 and 26 are set on the chart check points. Cursor 30 is set on any speed and on speed scale arm 14. Time line 56 is set at the same speed on speed scale arm 14. At this point time line 56 is parallel to the line passing through points of the scale arms (base chart line). Keeping the time scale arm parallel to the base line, the cursor is moved up or down speed scale arm 12 until the time line intersects the inner side of the speed scale at the desired travel time. The speed is read on either speed scale arm 12 or 14.

If desired, appropriate speed and time scales can be selected such that their device may be employed in aircraft navigation using the conventional sectional and WAC charts. Of course, it will be obvious to those skilled in the art that such factors as wind velocity and tide must be taken into account when determining the actual average speed to be either selected or calculated.

Other modifications will be apparent to those skilled in the art. For example, time scale arm 34 may be opaque below time line 56 and opaque above time line 56, so as to provide a limited viewing area at the time line to observe the intersection of the time line with the indicia on the speed scale arm.

A significant advantage of the computer lies in its compactness when folded for storage. As apparent from FIG. 1, computer arms 12, 14 can be folded about hinge 16 in abutting alignment, while time scale arm 34 may be rotated about hinge 36 toward hinge 16 to provide a compact stowed arrangement.

The invention is not to be limited except as set forth in the following claims:

Wherefore I claim:

1. A computer for use with navigation charts of a specified scale for solving any one unknown in the formula speed $\times$ time = distance, comprising:

a. first and second speed scale arms made of flat solid stock and each having straight parallel longitudinally extending inner and outer side edges and each having the same speed of travel scale similarly displayed thereon extending in the direction from the lower end of each lower portion of each arm toward an upper portion of each arm and having speed scale points at the lower ends of the inner side edges thereof to be positioned on the check points of a navigation chart;
b. a first pivotal connection between the upper ends of the first and second speed scale arms and positioned at a point in alignment with the inner edges thereof;
c. a cursor mounted on the first speed scale arm so as to be slidable longitudinally thereof and having an index line for registration with the speed scales on said first speed scale arm;
d. a transparent time scale arm made of flat stock and having at least one time scale formed thereon calibrated for use with a chart of a specified scale and extending in the direction from one end of the time scale arm towards the other end thereof; and,
e. a second pivotal connection movable along said speed scale connecting the time scale arm to the cursor, said second pivotal connection including locking means and clutch means, the unlocking of said locking means permitting the time scale arm to be pivotted between a folded position parallel with the speed scale arms and permitting an operative position extending between the speed scale arms and indicating similar points in the scales on the two arms, said second pivotal connection being positioned by said clutch means after locking said locking means so that its axis is intersected by a projection of the index line and so that the axis intersects the inner edge of the first time scale arm whereby the triangle formed by the first and second pivotal connections and the point of intersection between the inner edges of the second speed scale arm and the time scale is similar (in a geometric sense) to the triangle formed by the first pivotal connection and the two speed scale points so that the scales provide the solution for any one unknown factor in the formula-speed $x$ time = distance-when the scale points are applied to the check points on a chart of the specified scale and the arms are shifted to indicate the unknown factor of the time and speed factors.

2. A computer for use with the navigation charts of a specified scale as set forth in claim 1 in which the time scale arm is applied to the face of the first speed scale arm and the cursor has a body portion extending across the back of the first speed scale arm and the said locking means of said pivotal connection comprises a threaded stud extending through the body portion of the cursor and through the end portion of the time scale arm and has a cap screw applied to the outer end thereof, said stud having a grooved recess portion extending diametrically approximately half way through one portion thereof in alignment with and accommodating the inner edge of the first speed scale arm so that the axis of the stud is in alignment with the inner edge of said arm and so as to prevent rotation of the stud as the cap screw is tightened and loosened thereon and said clutch means of said second pivotal connection also includes a clutch plate through which the said stud extends and which is located in engagement with the face of the second speed scale arm and also a resilient washer interposed between the clutch plate and the time scale arm so that upon partial tightening of the cap screw the cursor is retained against accidental displacement and the time scale arm can be manually pivotted to cause it to indicate corresponding speed scale points on the speed scale arms.

* * * * *